US006211775B1

(12) United States Patent
Lee et al.

(10) Patent No.: US 6,211,775 B1

(45) Date of Patent: Apr. 3, 2001

(54) VIBRATION APPARATUS CAPABLE OF GENERATING AND EXTERNALLY TRANSMITTING A SOUND WAVE OF AUDIBLE FREQUENCY AND TRANSMITTING A VIBRATION FOR NOTIFICATION

(75) Inventors: In Ho Lee; Seog Hwan Jeong; Sung Tae Jeong, all of Suwon (KR)

(73) Assignee: Samsung Electro-Mechanics Co., Ltd., Kyungki-Do (KR)

(*) Notice: Subject to any disclaimer, the term of this patent is extended or adjusted under 35 U.S.C. 154(b) by 0 days.

(21) Appl. No.: 09/296,364

(22) Filed: Apr. 22, 1999

(30) Foreign Application Priority Data

| | | |
|---|---|---|
| Jun. 15, 1998 | (KR) | 98-22244 |
| Jun. 17, 1998 | (KR) | 98-22659 |
| Jun. 24, 1998 | (KR) | 98-23812 |
| Jun. 24, 1998 | (KR) | 98-23813 |
| Jun. 24, 1998 | (KR) | 98-23814 |
| Jun. 24, 1998 | (KR) | 98-23815 |

(51) Int. Cl.[7] ..................... H04B 3/36

(52) U.S. Cl. ..................... 340/407.1; 340/311.1; 340/825.46; 381/396; 381/400

(58) Field of Search ..................... 340/407.1, 388.1, 340/388.2, 388.3, 388.6, 391.1, 311.1, 825.44, 825.46; 116/142 R; 381/396, 400, 401

(56) References Cited

U.S. PATENT DOCUMENTS

| | | | | |
|---|---|---|---|---|
| 4,931,765 | * | 6/1990 | Rollins et al. | 340/407.1 |
| 5,172,092 | * | 12/1992 | Nguyen et al. | 340/407.1 |
| 5,488,351 | * | 1/1996 | Hedayatnia et al. | 340/407.1 |
| 5,528,697 | * | 6/1996 | Saito | 340/311.1 |
| 5,861,686 | * | 1/1999 | Lee | 340/388.1 |
| 5,894,263 | * | 4/1999 | Shimakawa et al. | 340/407.1 |

FOREIGN PATENT DOCUMENTS

| | | |
|---|---|---|
| 10014195 | 1/1998 | (JP) . |

* cited by examiner

*Primary Examiner*—Brent A. Swarthout
(74) *Attorney, Agent, or Firm*—Darby & Darby

(57) ABSTRACT

Disclosed is a vibration apparatus capable of generating both a sound wave and a vibration with a simple structure due to the fact that a driving control section selectively supplies a current relying upon a kind of frequency of the current inputted from the outside. If a high frequency current is inputted into the driving control section, because a vibrating body vibrates up and down by interaction between a magnet and a pair of vibrating coils which are disposed in a side-by-side relationship such that they are opposite to the magnet, a sound wave is generated whereby it is possible to notify of reception of an incoming call by the sound wave. If a low frequency current is inputted into the driving control section, because the vibrating body seesaws sideways by interaction between the magnet and the pair of vibrating coils, a vibration is generated as a seesaw motion of the vibrating body is transferred to a cover attached to a case of the apparatus whereby it is possible to notify of reception of an incoming call by the vibration.

21 Claims, 10 Drawing Sheets

VIBRATION APPARATUS CAPABLE OF GENERATING AND EXTERNALLY TRANSMITTING A SOUND WAVE OF AUDIBLE FREQUENCY AND TRANSMITTING A VIBRATION FOR NOTIFICATION

BACKGROUND OF THE INVENTION

1. Field of the Invention

The present invention relates to a vibration apparatus capable of generating and externally transmitting a sound wave of audible frequency and transmitting a vibration for notification, which is provided in a communication device such as a portable phone, a beeper or the like to selectively perform a sounding function and a vibrating function relying upon a frequency of a current inputted therein.

2. Description of the Related Art

Generally, the notification of the reception of an incoming call in a portable communication device can be performed by a sounding function and a vibrating function. Between these two functions, the sounding function by which bell or speaker sound can be discharged is mainly used, and the sounding function can be converted into the vibrating function to be used in such a situation where a silent atmosphere must be inevitably maintained.

In order to perform the sounding function and the vibrating function, a micro-speaker and a vibrating motor are provided in a communication device to be selectively operated in compliance with an instruction inputted by a user.

Referring to FIG. 1, there is shown a longitudinal cross-sectional view illustrating a construction of a conventional micro-speaker. The micro-speaker includes a case 1. A magnet 2, a voice coil 3 and a vibrating coil 4 are arranged in the case 1. In other words, the magnet 2 is secured at a center portion in the case 1. A cylindrically formed voice coil 3 is arranged around the magnet 2 such that it surrounds the magnet 2, and an upper end of the voice coil 3 which extends upward through the case 1 is attached to a vibrating coil 4. The magnet 2 has N and S poles which are stacked one up the other, and a portion adjacent to an edge of the vibrating coil 4 to which the voice coil 3 is attached, is securely fastened to a fastening member.

Accordingly, if a high frequency alternate current is inputted into the voice coil 3 through a lead wire, the alternate current flows at a lower end of the voice coil 3 which is inserted into the case 1, to form a magnetic field while interacting with the magnet 2.

At this time, when the magnetic field is formed in the same direction as a magnetic filed formed by the magnet 2, attractive force is generated between the magnet 2 and the voice coil 3 to lower the voice coil 3. If a polarity of a current which flows through the voice coil 3 is converted into a reverse polarity, repulsive force is generated between the magnet 2 and the voice coil 3 to raise the voice coil 3.

By repeatedly lowering and raising the voice coil 3 using the high frequency current inputted into the voice coil 3, the vibrating plate 4 to which the voice coil 3 is attached moves up and down. By this upward and downward movement of the vibrating plate 4, a sound wave is generated.

In a speaker manufactured using a principle that the vibrating plate 4 is moved up and down by the inputted high frequency current to generate a sound wave, a high frequency signal such as a melody, a bell or a sound signal of a sender, which is inputted in advance into the voice coil 3, is discharged by the upward and downward movement of the vibrating plate 4 to perform the sounding function.

However, because the speaker can simply produce a sound, to afford not only the sounding function but also the vibrating function, a separate vibrating motor must be provided.

On the other hand, as demands toward miniaturization and thinning of a communication device are increased, while it is necessary for several components to be omitted and a size of the communication device to be reduced, a speaker and a vibrating motor are still used together for notifying the reception of an incoming call in a communication device.

Recently, various vibration generating apparatuses for simultaneously performing a speaker function and a vibration function are disclosed in the art. A typical example of these vibration generating apparatuses is described in Japanese Patent Laid-Open Publication No. Heisei 10-14195 (published on Jan. 16, 1998) as shown in FIG. 2.

The vibration generating apparatus includes largely a permanent magnet 300 fastened to a fastening member 400, upper and lower yokes 310 and 320 attached to upper and lower surfaces of the permanent magnet 300 for preventing magnetic flux from being leaked and forming a magnetic flux path, a coil 121 arranged such that it is crossed with the magnetic flux of the permanent magnet 300, a first vibrating body 120 supported to the fastening member 400 by a first elastic member 110, a second vibrating body 220 supported to the first vibrating body 120 by a second elastic member 210, and a current supplying section 500 connected to the coil 121 for supplying a current of a predetermined frequency to the coil 121.

In the vibration generating apparatus constructed as mentioned above, if a current is inputted into the coil 121 from the current supplying section 500, electromagnetic force is generated due to interaction between the permanent magnet 300 and the coil 121. Accordingly, by periodically changing the current flowing through the coil 121 to have a high frequency and a low frequency, electromagnetic force is periodically generated as external force to a magnetic circuit section having the permanent magnet 300 and the upper and lower yokes 310 and 320 and to the first vibrating body 120, and by this, a forced vibration occurs in a first vibration system 100 including the first vibrating body 120.

By this vibration, a second vibration system 200 is also vibrated, and as a result, vibrations are occurred in the first and second vibration systems 100 and 200 by the permanent magnet 300 and the coil 121.

That is to say, if a current having a frequency which corresponds to a natural vibration frequency of the first vibrating body 120 is inputted into the coil 121, vibrating function which is similar to conventional vibrating function is accomplished by the first vibrating body 120. Also, if a current having a frequency which corresponds to a natural vibration frequency of the second vibrating body 220 is inputted into the coil 121, a sound is generated by the second vibrating body 220.

However, in the vibration generating apparatus of the related art, since the vibrating function is performed by the fact that the first vibrating body 120 is vibrated to be collided with the case 400 to generate a vibration which is to be sensed by a user through the case 400, although a shock-absorbing material is attached to the case 400 at a place where the first vibrating body 120 is collided with the case 400, noise is generated by the collision, and since the vibration is transmitted through the first and second elastic members 110 and 210 to the case 400, lower vibration level is obtained.

Also, durability of the vibration generating apparatus is deteriorated due to the repeated collision between a bobbin 122 of the first vibrating body 120 and the case 400. Moreover, it is difficult to properly design material and shape for the first elastic member 110, the second vibrating body 220 and the second elastic member 210 and to determine elastic modulus for the first and second elastic members 110 and 210, whereby the vibration generating apparatus cannot be easily manufactured.

SUMMARY OF THE INVENTION

Accordingly, the present invention has been made in an effort to solve the problems occurring in the related art, and a primary object of the present invention is to provide a vibration apparatus capable of generating and externally transmitting a sound wave of audible frequency and transmitting a vibration for notification, which performs both a sounding function and a vibrating function with a simple structure, thereby to promote miniaturization of a communication device.

Another object of the present invention is to provide the vibration apparatus capable of generating and externally transmitting a sound wave of audible frequency and transmitting a vibration for notification, in which components are prevented from being collided one with another when performing the vibrating function, thereby to increase durability of the communication device and render the communication device to be semi-permanently used.

Still another object of the present invention is to provide the vibration apparatus capable of generating and externally transmitting a sound wave of audible frequency and transmitting a vibration for notification, which can realize miniaturization and thinning of the communication device.

In order to achieve the above objects, a vibration apparatus according to the present invention includes a voice coil and a pair of vibrating coils into which currents are inputted from the outside. In the vibration device, if a high frequency current is inputted, a vibrating plate or a vibrating body having a construction which is similar to that of the vibrating plate moves up and down, thereby to generate a sound wave, whereby it is possible to notify of reception of an incoming call by the sound wave. If a low frequency current is inputted, because currents having different polarities flow to both ends of each of the pair of vibrating coils which are disposed in a side-by-side relationship such that they are opposite to a magnet, the magnet or the vibrating body onto which the pair of vibrating coils are attached seesaws sideways, thereby to generate a vibration as a seesaw motion of the magnet or the vibrating body is transferred to a cover attached to a case of a communication device, whereby it is possible to notify of reception of an incoming call by the vibration.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION

Figure 1:
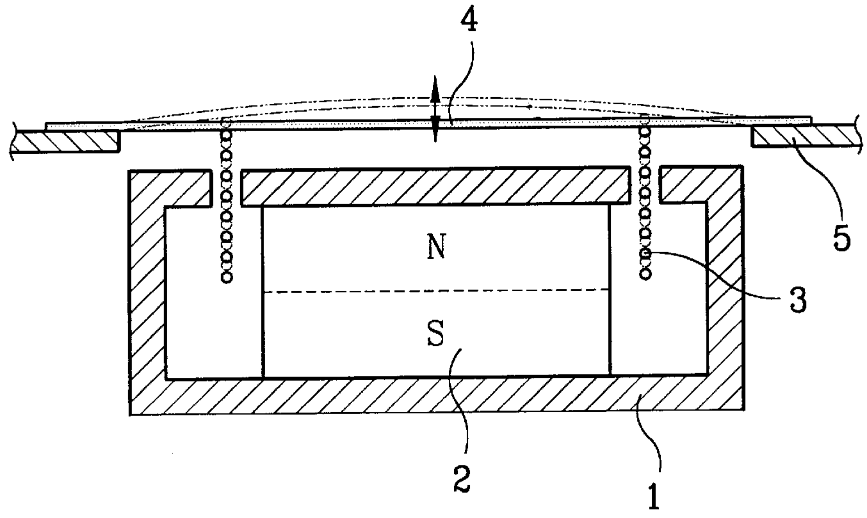
FIG.1 (CONVENTIONAL ART)
FIG. 1 is a longitudinal cross-sectional view illustrating a construction of a conventional micro-speaker.
Figure 2:
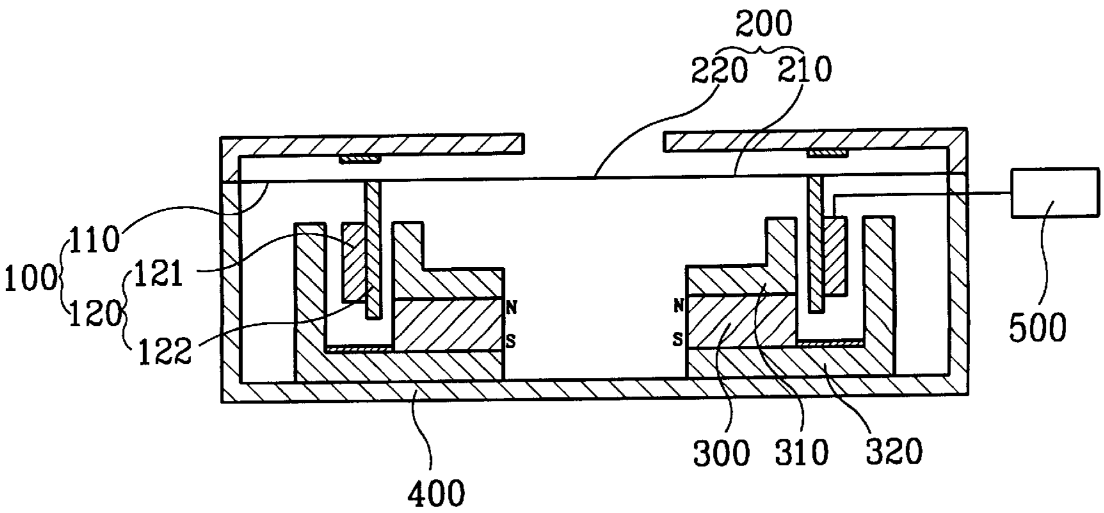
FIG.2 (CONVENTIONAL ART)
FIG. 2 is a longitudinal cross-sectional view of a vibration generating apparatus of the related art.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
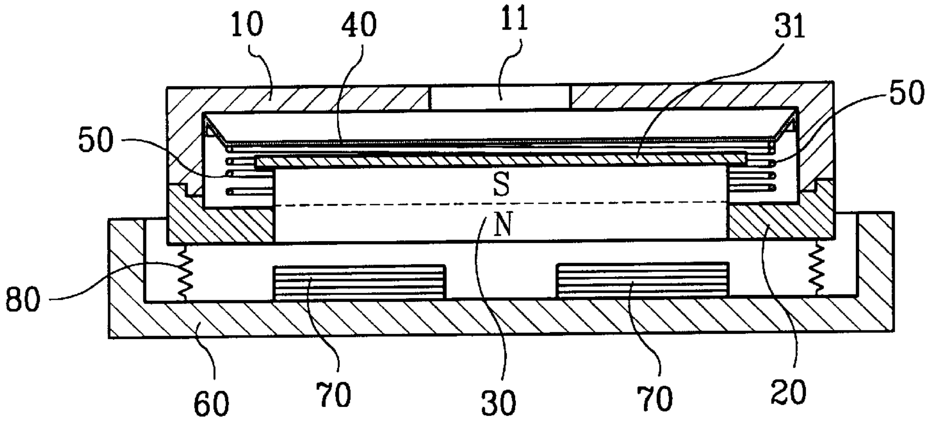
FIG. 3 is a longitudinal cross-sectional view of a vibration apparatus in accordance with a first embodiment of the present invention.
Figure 4:
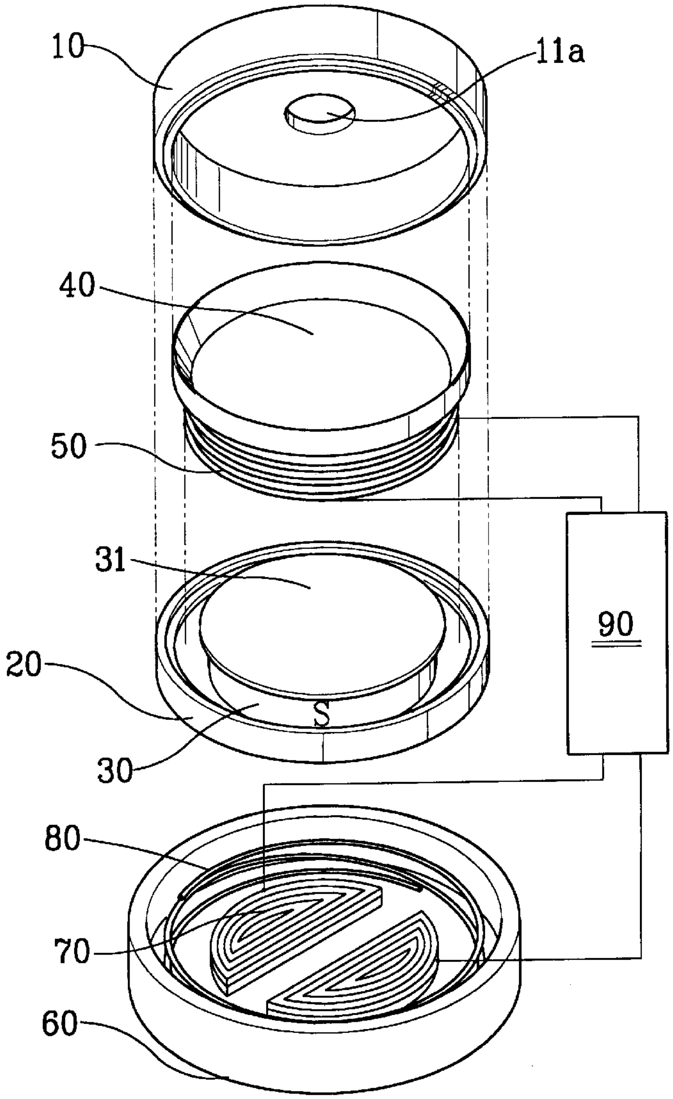
FIG. 4 is an exploded perspective view of the vibration apparatus of FIG. 3.

Referring to FIG. 3, there is shown a longitudinal cross-sectional view of a vibration apparatus in accordance with a first embodiment of the present invention; and FIG. 4 is an exploded perspective view of the vibration apparatus of FIG. 3. The vibration apparatus of the present embodiment is largely divided into a first vibrating section, a second vibrating section, a fixed section and a driving control section.

The first vibrating section includes an upper cover 10, a lower cover 20, a magnet 30 and a yoke 31. The upper cover 10 has a cap-shaped configuration which opens downward. A center portion of a top wall of the upper cover 10 is formed with a sound discharging hole 11 which communicates the outside with the inside. The lower cover 20 has a cup-shaped configuration which opens upward. The lower cover 20 possesses an upper end which is coupled to a lower end of the upper cover 10. A center portion of a bottom wall of the lower cover 20 is formed with an opening which has a diameter nearly approaching to that of the bottom wall of the lower cover 20.

The magnet 30 is closely fitted into the opening formed in the bottom wall of the lower cover 20 to be securely fastened thereto, and the yoke 31 is bonded onto the magnet 30. At this time, the yoke 31 has a diameter which is larger than that of the magnet 30 and at the same time, prevents magnetic flux leakage from the magnet 30. The yoke 31 provides smooth magnetic flux flow which is connected to the magnet 30, yoke 31, upper cover 10 and lower cover 20.

The second vibrating section includes a vibrating plate 40 and a voice coil 50 attached to the vibrating plate 40. The vibrating plate 40 is arranged above the yoke 31 such that it is separated from an upper surface of the yoke 31 by a short distance and has a diameter which is larger than that of the yoke 31. The vibrating plate 40 is flat plate-shaped vibrating means. The vibrating plate 40 is slopingly bent upward at a portion adjacent an edge thereof, and the edge of the vibrating plate 40 is fixedly secured to an inner surface of the upper cover 10.

The voice coil 50 is configured such that it surrounds the magnet 30 and the yoke 31, and has a diameter which is larger than that of the yoke 31. An upper end of the voice coil 50 is fastened to a flat portion of the vibrating plate 40. The voice coil 50 is an operating member which is moved up and down while interacting with the magnet 30 when a current is inputted.

The fixed section includes a fixed cover 60, a pair of vibrating coils 70 and an elastic member 80. The fixed cover 60 is positioned below the first vibrating section and attached to a case of a communication device as fastening means. The pair of vibrating coils 70 are attached onto an upper surface of the fixed cover 60 in a side-by-side relationship such that they are opposite to the magnet 30. The elastic member 80 elastically connects the first vibrating section and the fixed cover 60 with each other and serves as connecting means for transmitting vibrating force to the fixed cover 60.

Figure 5:
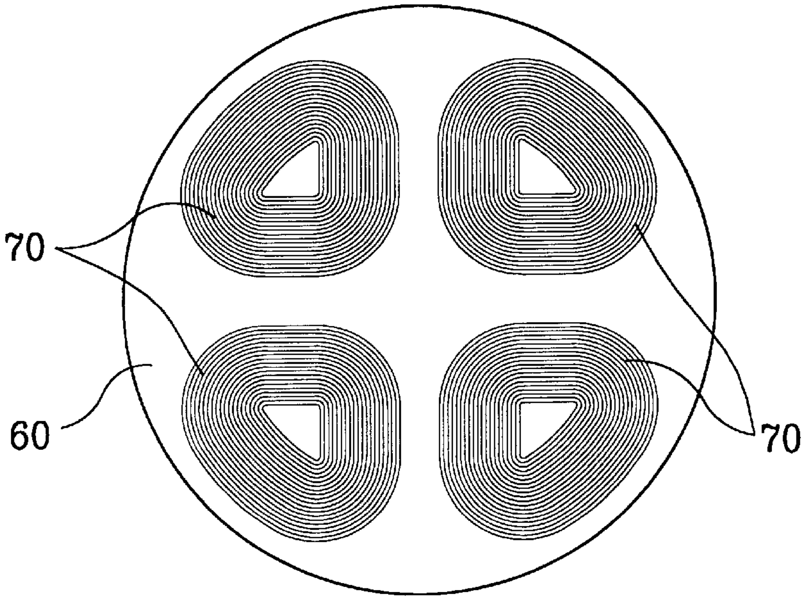
FIG. 5 is a plan view illustrating another possible arrangement of vibrating coils according to the present invention.

Specifically, the vibrating coils 70 can be provided as a pair at both sides on the upper surface of the fixed cover 60 to be connected in series such that their winding directions are opposite to each other to have different polarities when currents flow, and alternatively, as shown in FIG. 5, at least two pairs of coils can be connected in series such that a coil into which a current is inputted is sequentially changed. Also, it is most preferred that the elastic member 80 for elastically supporting the first vibrating section is formed using a coil spring.

On the other hand, the driving control section 90 serves as power supplying means which selectively supplies currents to the voice coil 50 of the second vibrating section and the pair of vibrating coils 70 attached onto the upper surface of the fixed cover 60, and causes the polarities of the supplied currents to be alternately changed. Especially, the driving control section 90 has a switching function for allowing currents having different polarities to flow through the pair of vibrating coils 70.

In other words, the driving control section 90 has input terminals and output terminals which are connected to the voice coil 50 and the pair of vibrating coils 70, respectively. The driving control section 90 supplies a current which has a frequency corresponding to a natural frequency of the first vibrating section and a current which has a frequency corresponding to a natural frequency of the second vibrating section, depending on a frequency of a current.

The driving control section 90 includes a current supplying part for selectively supplying currents to the voice coil 50 and the pair of vibrating coils 70 and a switching part for selectively switching connections between the pair of vibrating coils 70.

Figure 6:
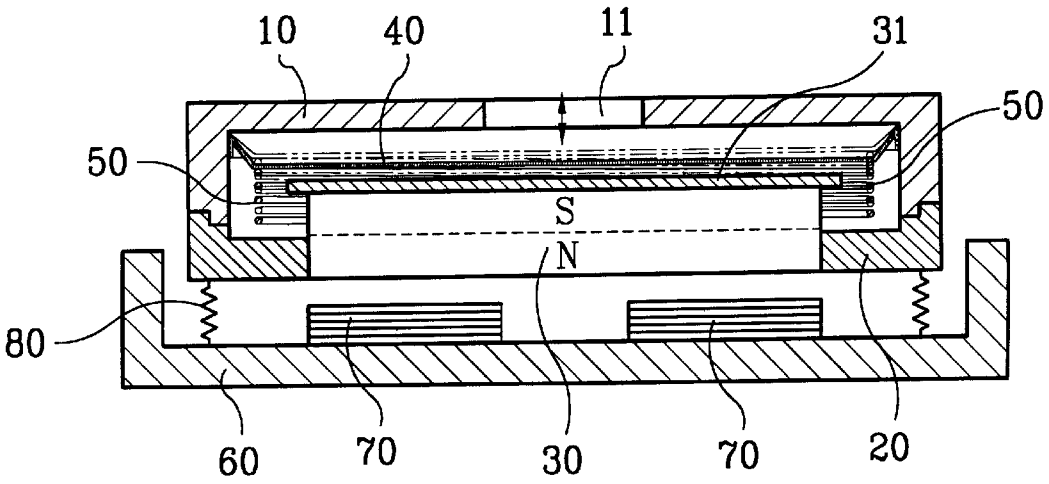
FIG. 6 is a longitudinal cross-sectional view illustrating operations of the vibration apparatus according to the first embodiment of the present invention when a sound wave is generated by a second vibrating section.

Therefore, if a high frequency current for generating a sound wave which corresponds to the natural frequency of the first vibrating section, is inputted into the driving control section 90, by supplying the high frequency current to the voice coil 50 while alternately changing its polarities, attractive force and repulsive force are alternately generated between the voice coil 50 and the magnet 30 as shown in FIG. 6, and according to this, the voice coil 50 which is movably arranged is moved up and down. By this, the vibrating plate 40 attached to the upper end of the voice coil 50 is also moved in a state that it is interlocked with the voice coil 50, and a sound wave is generated by the upward and downward movement of the vibrating plate 40. The sound wave generated in this way is discharged through the sound discharging hole 11 formed in the upper cover 10 to be sensed as a sound signal.

Figure 7:
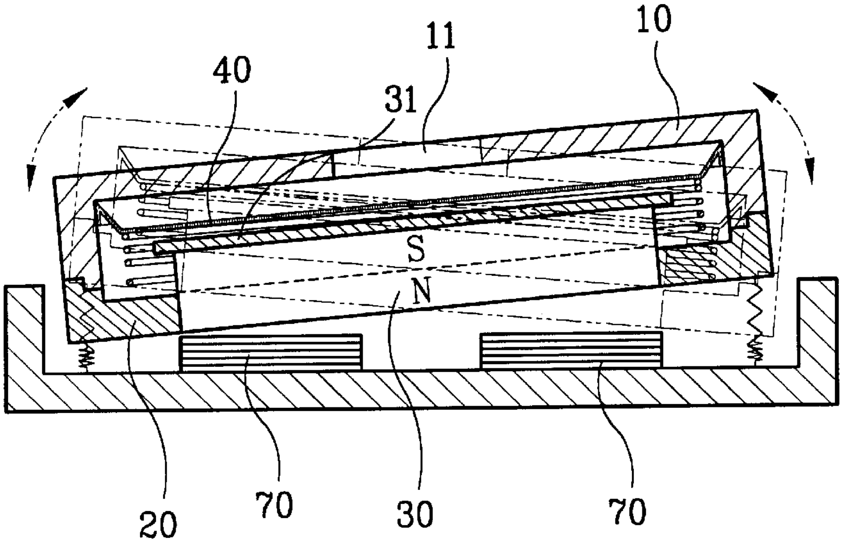
FIG. 7 is a longitudinal cross-sectional view illustrating operations of the vibration apparatus according to the first embodiment of the present invention when a seesaw vibration is generated by a first vibrating section.

On the other hand, if a low frequency current for generating a vibration which corresponds to the natural frequency of the second vibrating section, is inputted into the driving control section 90, by supplying the low frequency current to the pair of vibrating coils 70 attached onto the upper surface of the fixed cover 60 while alternately changing their polarities as in the case of the voice coil 50, the first vibrating section seesaws sideways as shown in FIG. 7.

That is to say, by the currents supplied to the pair of vibrating coils 70, currents having different polarities flow through the pair of vibrating coils 70, and at this time, attractive force and repulsive force are generated in the pair of vibrating coils 70 by interaction between the pair of vibrating coils 70 and the magnet 30 which are opposite to each other.

Namely, if attractive force is generated between one coil and the magnet 30, since repulsive force is generated between the other coil and the magnet 30, the magnet 30 which is movably disposed seesaws sideways. At this time, because the magnet 30 is integrally coupled to the lower cover 20 which is in turn coupled to the upper cover 10, the entire first vibrating section seesaws sideways.

Vibrating force generated by this seesaw motion is transmitted through the elastic member 80 which connects the first vibrating section and the fixed cover 60 with each other, to the fixed cover 60. The vibrating force transmitted in this way can be sensed by a user as a vibration through the case of the communication device to which the fixed cover 60 is attached.

In the meantime, by the magnet 30 of the first vibrating section, two magnetic circuits each having a magnetic gap are defined between the upper cover 10 and the lower cover 20 and between the lower cover 20 and the fixed cover 60, respectively. It is most preferred that in these magnetic gaps, magnetic fields of the voice coil 50 and the pair of vibrating coils 70 are positioned such that they are orthogonal to a magnetic field of the magnet 30.

Figure 8:
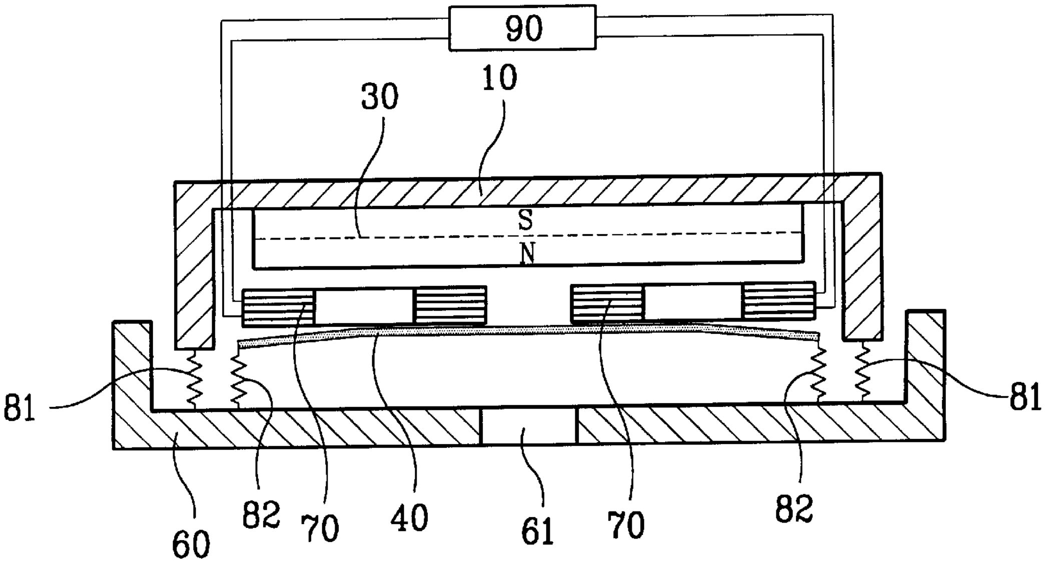
FIG. 8 is a longitudinal cross-sectional view of a vibration apparatus in accordance with a second embodiment of the present invention.

Referring to FIG. 8, there is shown a longitudinal cross-sectional view of a vibration apparatus in accordance with a second embodiment of the present invention.

While the construction of the present embodiment is similar to that of the first embodiment in that it has a first vibrating section, a fixed section, a second vibrating section and a driving control section, in this embodiment of the present invention, the first vibrating section has an upper cover 10 and a magnet 30 secured to an inner surface of the upper cover 10. The upper cover 10 has a cap-shaped configuration which opens downward, and the magnet 30 has polarities which are divided up and down.

The fixed section has a fixed cover 60 which is positioned below the upper cover 10 and connected to the upper cover 10 by a first elastic member 81. The fixed cover 60 is formed at a center portion thereof with a sound discharging hole 61.

The second vibrating section includes a vibrating plate 40 which is positioned above the fixed cover 60 and connected to the fixed cover 60 by a second elastic member 82 and a pair of vibrating coils 70 which are attached onto the vibrating plate 40. At this time, the second elastic member 82 is positioned inside the first elastic member 81 which connects the fixed cover 60 and the upper cover 10 with each other. The pair of vibrating coils 70 are attached onto at least an upper surface of the vibrating plate 40 in a side-by-side relationship such that they are opposite to the magnet 30, or as in the first embodiment, at least two pairs of coils can be connected to form the vibrating coils 70. Specifically, the vibrating coils 70 are connected in series.

On the other hand, the driving control section 90 serves as power supplying means which supplies currents to the pair of vibrating coils 70 of the second vibrating section and causes the supplied currents to have the same polarity or different polarities.

Namely, the driving control section 90 selectively supplies a current which has a frequency corresponding to a natural frequency of the first vibrating section and a current which has a frequency corresponding to a natural frequency of the second vibrating section by supplying currents of predetermined frequencies to the pair of vibrating coils 70.

The driving control section 90 includes a current supplying part for supplying currents to the pair of vibrating coils 70 and a switching part for selectively switching connections between the pair of vibrating coils 70.

Figure 9:
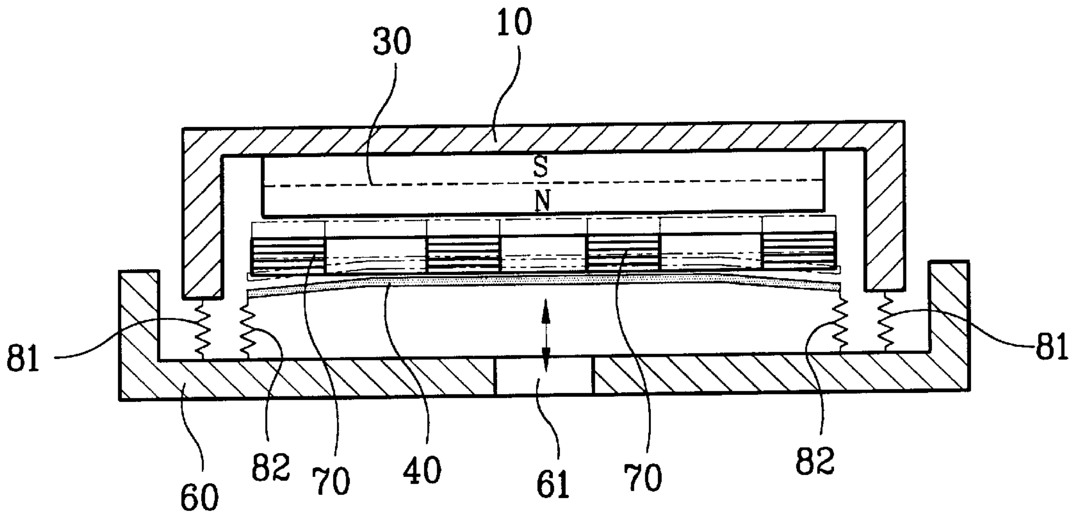
FIG. 9 is a longitudinal cross-sectional view illustrating operations of the vibration apparatus according to the second embodiment of the present invention when a sound wave is generated by a second vibrating section.

Therefore, if a high frequency current for generating a sound wave which corresponds to the natural frequency of the second vibrating section, is inputted into the driving control section 90, by supplying the high frequency current to the pair of vibrating coils 70 while causing currents to flow in the pair of vibrating coils 70 in the same direction to allow the currents to have the same polarity, attractive force and repulsive force are alternately generated between the pair of vibrating coils 70 and the magnet 30 as shown in FIG. 9, and according to this, the second vibrating section having the pair of vibrating coils 70 which are movably arranged and the vibrating plate 40 which is attached to the pair of vibrating coils 70 is moved up and down.

By this upward and downward movements of the second vibrating section, a sound wave is generated between the vibrating plate 40 and the upper surface of the fixed plate 60. The sound wave generated in this way is discharged through the sound discharging hole 61 formed in the fixed cover 60 to be sensed as a sound signal.

Figure 10:
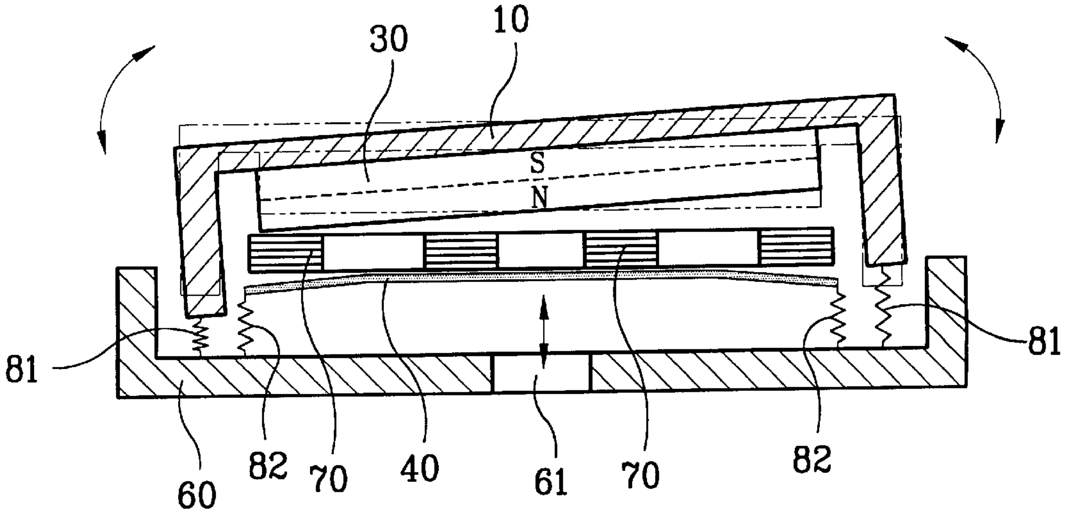
FIG. 10 is a longitudinal cross-sectional view illustrating operations of the vibration apparatus according to the second embodiment of the present invention when a seesaw vibration is generated by a first vibrating section.

On the other hand, if a low frequency current for generating a vibration which corresponds to the natural frequency of the first vibrating section, is inputted into the driving control section 90, by supplying the low frequency current to the pair of vibrating coils 70 attached onto the upper surface of the fixed cover 60 while switching connecting terminals of the pair of vibrating coils 70 such that currents flow in the pair of vibrating coils 70 in opposite directions to allow the pair of vibrating coils 70 to have different polarities, the first vibrating section seesaws sideways as shown in FIG. 10.

That is to say, by the currents supplied to the pair of vibrating coils 70, currents having different polarities flow through the pair of vibrating coils 70, and at this time, attractive force and repulsive force are generated in the pair of vibrating coils 70 by interaction between the pair of vibrating coils 70 and the magnet 30 which are opposite to each other.

Namely, if attractive force is generated between one coil and the magnet 30, since repulsive force is generated between the other coil and the magnet 30, the first vibrating section having the natural frequency corresponding to a natural frequency of the low frequency current seesaws sideways.

The vibrating force generated by this seesaw motion is transmitted through the elastic member 81 which connects the first vibrating section and the fixed cover 60 with each other, to the fixed cover 60. The vibrating force transmitted in this way can be sensed by a receiver as a vibration through the case of the communication device to which the fixed cover 60 is attached.

In the meantime, by the magnet 30 of the first vibrating section, a magnetic circuit having a magnetic gap is defined between the upper cover 10 and the fixed cover 60. A magnetic field generated from the pair of vibrating coils 70 of the second vibrating section in the magnetic gap is positioned such that it is orthogonal to a magnetic field of the magnet 30.

Figure 11:
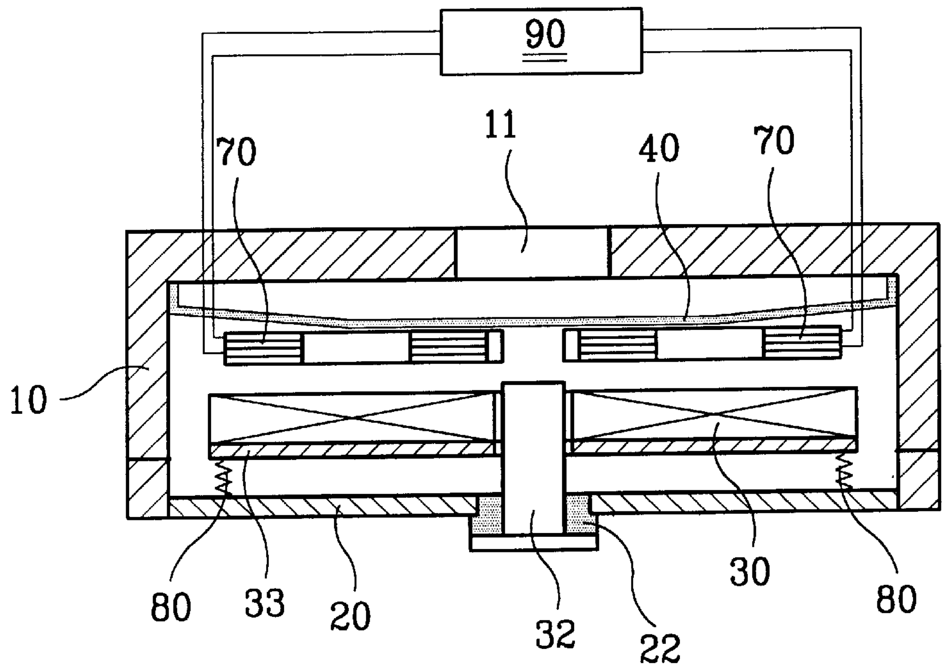
FIG. 11 is a longitudinal cross-sectional view of a vibration apparatus in accordance with a third embodiment of the present invention.

Referring to FIG. 11, there is shown a longitudinal cross-sectional view of a vibration apparatus in accordance with a third embodiment of the present invention.

The vibration apparatus of this embodiment has an outer case, a first vibrating section, a second vibrating section and a driving control section.

The outer case includes an upper cover 10 and a lower cover 20. The upper cover 10 has a cap-shaped configuration which opens downward, and the lower cover 20 covers a lower end of the upper cover 10. The upper cover 10 is formed at a center portion thereof with a sound discharging hole 11.

The first vibrating section includes a magnet 30 which is connected to the lower cover 20 by an elastic member 80 and a vertical shaft 32 which movably guides the magnet 30.

At this time, the vertical shaft 32 has a lower end which is connected to the lower cover 20 to prevent the magnet 30 from being excessively moved sideways.

The second vibrating section includes a vibrating plate 40 which is arranged between a top wall of the upper cover 10 and the magnet 30, and a pair of vibrating coils 70. At this time, the vibrating plate 40 is secured to an inner surface of the top wall of the upper cover 10, and the pair of vibrating coils 70 are attached onto a lower surface of the vibrating plate 40 such that they are opposite to the magnet 30.

Accordingly, a magnetic circuit having a magnetic gap is defined between the upper cover 10 and the lower cover 20 while the magnet 30 is placed at a middle portion, and in this magnetic gap, magnetic fields of the pair of vibrating coils 70 and the magnet 30 are orthogonal to each other to create electromagnetic force.

Further, at least two pairs of coils can be provided to form the vibrating coils 70 of the second vibrating section. Specifically, the vertical shaft 32 can be connected to the lower cover 20 via a damping member 22, and according to this, an upper end of the vertical shaft 32 arranged between the upper cover 10 and the lower cover 20 can be moved sideways to some extent.

On the other hand, the driving control section 90 serves as actual control means connected to the pair of vibrating coils 70 of the second vibrating section for receiving and supplying predetermined frequencies.

The driving control section 90 includes a current supplying part for supplying currents having the predetermined frequencies to the pair of vibrating coils 70 and a switching part for selectively switching connections between the pair of vibrating coils 70 such that currents having the same polarity and different polarities can selectively flow through the pair of vibrating coils 70.

Consequently, if a high frequency current for generating a sound wave is inputted into the driving control section 90, the high frequency current is supplied to the pair of vibrating coils 70, and at the same time, the connections between the pair of vibrating coils 70 are switched such that currents having the same polarity flow in the pair of vibrating coils 70 in the same direction.

Figure 12:
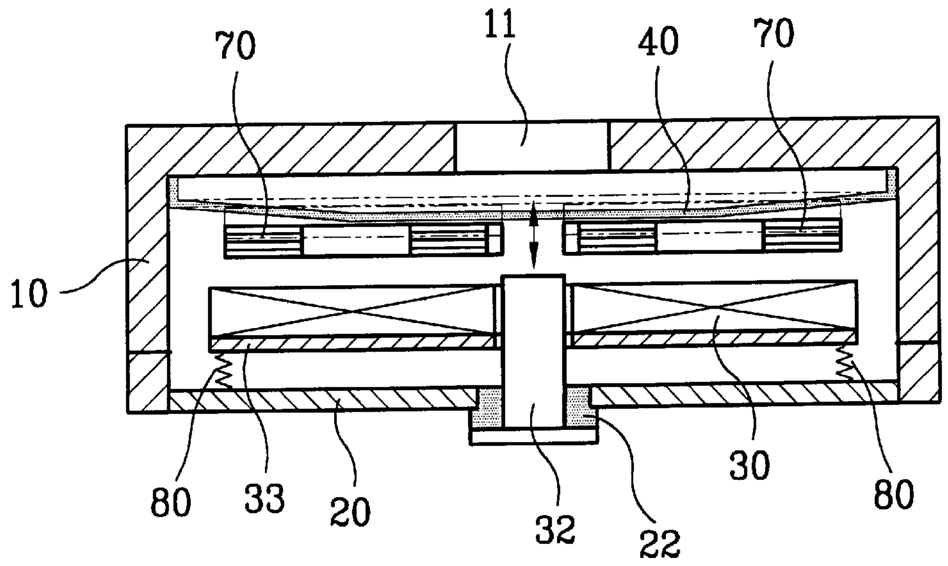
FIG. 12 is a longitudinal cross-sectional view illustrating operations of the vibration apparatus according to the third embodiment of the present invention when a sound wave is generated by a second vibrating section.

If the currents are supplied as described above, attractive force and repulsive force are alternately generated between the pair of vibrating coils 70 and the magnet 30 as shown in FIG. 12 while creating electromagnetic force.

At this time, as the second vibrating section having a natural frequency which is the same as that of the high frequency current inputted into the pair of vibrating coils 70 repeatedly moves up and down at high speed, a sound wave is generated by the vibrating plate 40 of the second vibrating section. The sound wave generated in this way is discharged through the sound discharging hole 11 formed in the upper cover 10 to be sensed as a sound signal.

On the other hand, if a low frequency current for generating a vibration is inputted into the driving control section 90, the low frequency current is supplied to the pair of vibrating coils 70, and at the same time, the connections between the pair of vibrating coils 70 are switched such that currents having different polarities flow in the pair of vibrating coils 70 in opposite directions.

Figure 13:
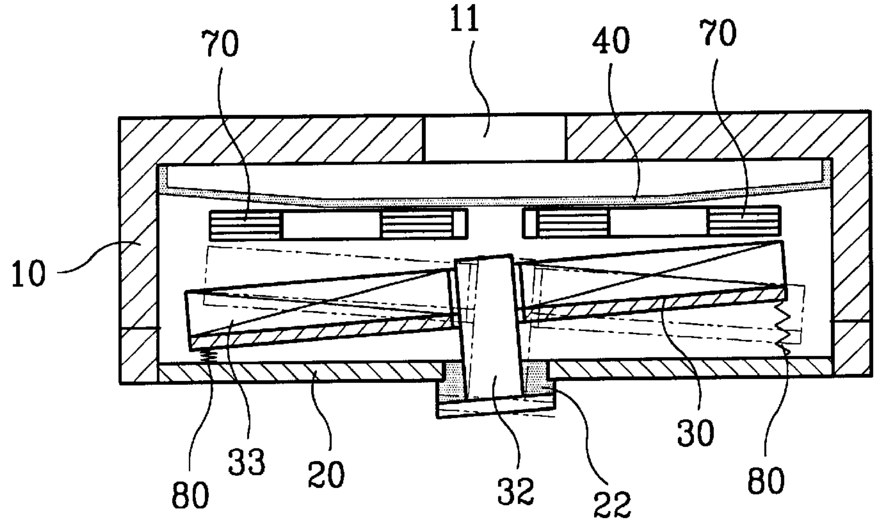
FIG. 13 is a longitudinal cross-sectional view illustrating operations of the vibration apparatus according to the third embodiment of the present invention when a seesaw vibration is generated by a first vibrating section.

If the currents are supplied as just described above, attractive force and repulsive force are alternately generated between the pair of vibrating coils 70 and the magnet 30 as shown in FIG. 13 while creating electromagnetic force.

At this time, as the first vibrating section having a natural frequency which is the same as that of the low frequency current inputted into the pair of vibrating coils 70 repeatedly seesaws sideways, vibrating force is transmitted through the elastic member 80 of the first vibrating section to the lower cover 20. The vibrating force transmitted in this way can be sensed by a receiver as a vibration while being transmitted to the case of the communication device.

In the meanwhile, in order to increase the vibrating force generated by the seesaw motion of the first vibrating section, as best shown in FIGS. 11 through 13, it is more preferable that a weight 33 having a predetermined weight be attached to a lower surface or a circumferential outer surface of the magnet 30.

Also, as described above, in the case that a plurality of coils are used to form the vibrating coils 70 of the second vibrating section, if a current is sequentially supplied to only one coil in a rotational direction by the switching part of the driving control section, as attractive force is generated between the coil supplied with the current and the magnet 30, the first vibrating section is eventually made to seesaw three-dimensionally and wave vibration effect can be obtained, whereby vibrating force can be more amplified.

Figure 14:
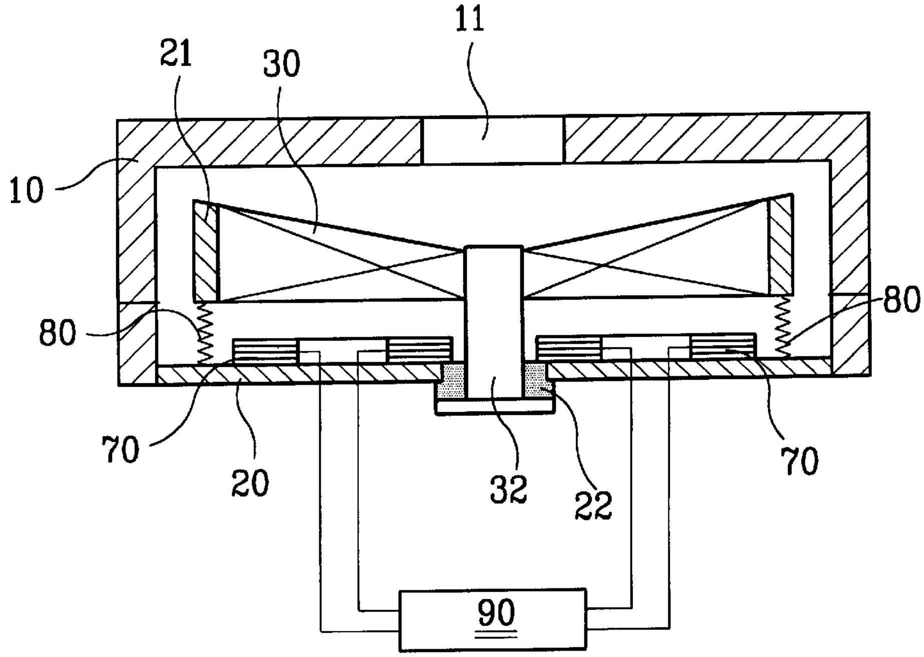
FIG. 14 is a longitudinal cross-sectional view of a vibration apparatus in accordance with a fourth embodiment of the present invention.

Referring to FIG. 14, there is shown a longitudinal cross-sectional view of a vibration apparatus in accordance with a fourth embodiment of the present invention. The vibration apparatus of this embodiment largely includes an outer case, a vibrating section and a driving control section.

As aforementioned in the third embodiment, the outer case includes an upper cover 10 and a lower cover 20. The upper cover 10 has a cap-shaped configuration which opens downward, and the lower cover 20 covers a lower end of the upper cover 10. The upper cover 10 is formed at a center portion thereof with a sound discharging hole 11. A pair of vibrating coils 70 are attached onto an upper surface of the lower cover 20.

The vibrating section includes a magnet 30 which is connected to the lower cover 20 by an elastic member 80, and a vertical shaft 32 which supports the magnet 30 such that it can be slid up and down. Specifically, an upper surface of the magnet 30 which is opposite to the sound discharging hole 11 of the upper cover 10, is tapered upward from a center portion thereof toward an edge portion thereof. The vertical shaft 32 has a lower end which is connected to the lower cover 20 via a damping member 22 to allow an upper end of the vertical shaft 32 to be moved sideways to some extent.

By this arrangement, a magnetic circuit having a magnetic gap is defined between the upper cover 10 and the lower cover 20 while the magnet 30 is placed at a middle portion, and in this magnetic circuit, magnetic fields of the pair of vibrating coils 70 and the magnet 30 are orthogonal to each other to create electromagnetic force.

Further, at least two pairs of coils can be provided to form the vibrating coils 70 attached onto the upper surface of the lower cover 20. A weight 33 having a predetermined weight can be attached to a lower surface or both side surfaces of the magnet 30 of the vibrating section, to amplify vibrating force of the vibrating section.

On the other hand, the driving control section 90 serves as actual control means connected to the pair of vibrating coils 70 attached onto the lower cover 20 for receiving and supplying predetermined frequencies.

The driving control section 90 includes a current supplying part for supplying currents having the predetermined frequencies to the pair of vibrating coils 70 and a switching part for selectively switching connections between the pair of vibrating coils 70 such that currents having the same polarity and different polarities can selectively flow through the pair of vibrating coils 70.

Consequently, if a high frequency current for generating a sound wave is inputted into the driving control section 90, the high frequency current is supplied to the pair of vibrating coils 70, and at the same time, the connections between the pair of vibrating coils 70 are switched such that currents having the same polarity flow in the pair of vibrating coils 70 in the same direction.

Figure 15:
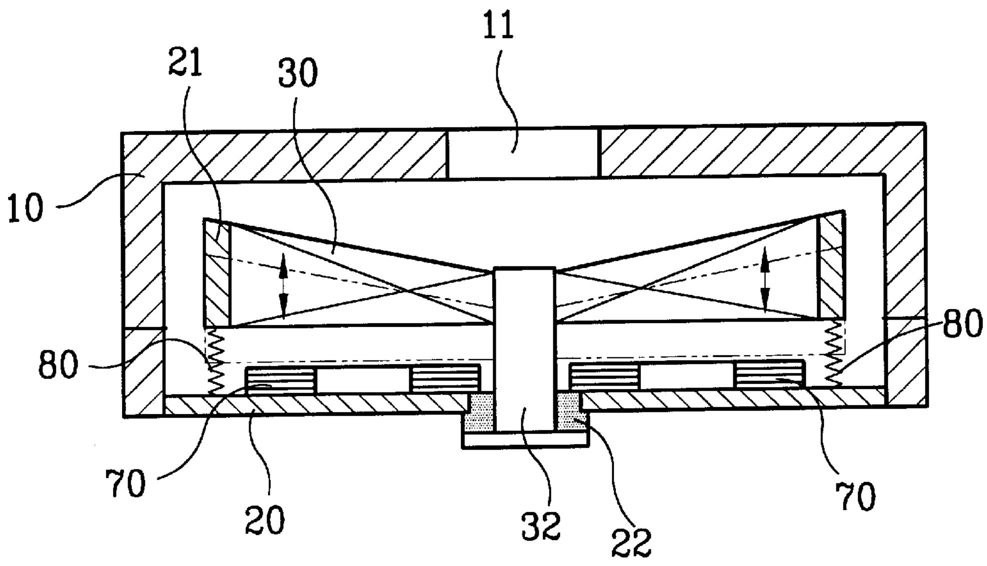
FIG. 15 is a longitudinal cross-sectional view illustrating operations of the vibration apparatus according to the fourth embodiment of the present invention when a sound wave is generated as a vibrating section moves up and down.

If the currents are supplied as described above, attractive force and repulsive force are alternately generated between the pair of vibrating coils 70 and the magnet 30 as shown in FIG. 15 while creating electromagnetic force.

By this interaction, as the vibrating section repeatedly moves up and down at high speed, a sound wave is generated by the magnet 30 of the vibrating section. The sound wave generated in this way is discharged through the sound discharging hole 11 formed in the upper cover 10 to be sensed as a sound signal.

On the other hand, if a low frequency current for generating a vibration is inputted into the driving control section 90, the low frequency current is supplied to the pair of vibrating coils 70, and at the same time, the connections between the pair of vibrating coils 70 are switched such that currents having different polarities flow in the pair of vibrating coils 70 in opposite directions.

Figure 16:
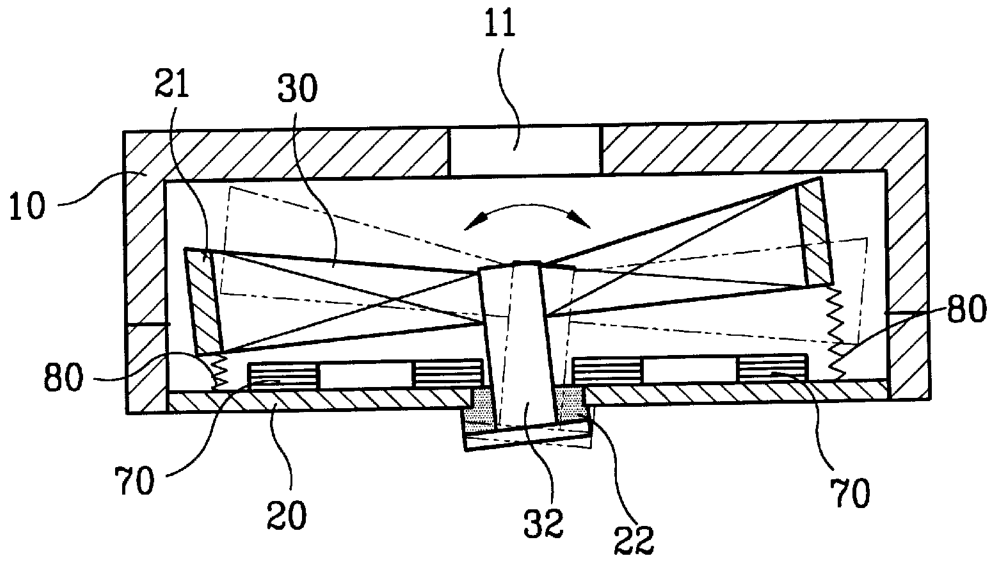
FIG. 16 is a longitudinal cross-sectional view illustrating operations of the vibration apparatus according to the fourth embodiment of the present invention when a vibration is generated as the vibrating section seesaws sideways.

If the currents are supplied as just described above, attractive force and repulsive force are alternately generated between the pair of vibrating coils 70 and the magnet 30 as shown in FIG. 16 while creating electromagnetic force.

By this interaction, as the vibrating section repeatedly seesaws sideways, the seesaw motion is transmitted through the elastic member 80 which connects the vibrating section to the lower cover 20. The vibrating force transmitted to the lower cover 20 in this way can be sensed by a receiver as a vibration while being transmitted to the case of the communication device.

In the meanwhile, in order to increase the vibrating force generated by the seesaw motion of the vibrating section, as best shown in FIGS. 14 through 16, it is more preferable that a weight 33 having a predetermined weight be attached to a lower surface or a circumferential outer surface of the magnet 30.

Also, as described above, in the case that a plurality of coils are used to form the vibrating coils 70 of the vibrating section, if a current is sequentially supplied to only one coil in a rotational direction by the switching part of the driving control section, as attractive force is generated between the coil supplied with the current and the magnet 30, the vibrating section is eventually made to seesaw three-dimensionally and wave vibration effect can be obtained, whereby vibrating force can be more amplified.

Figure 17:
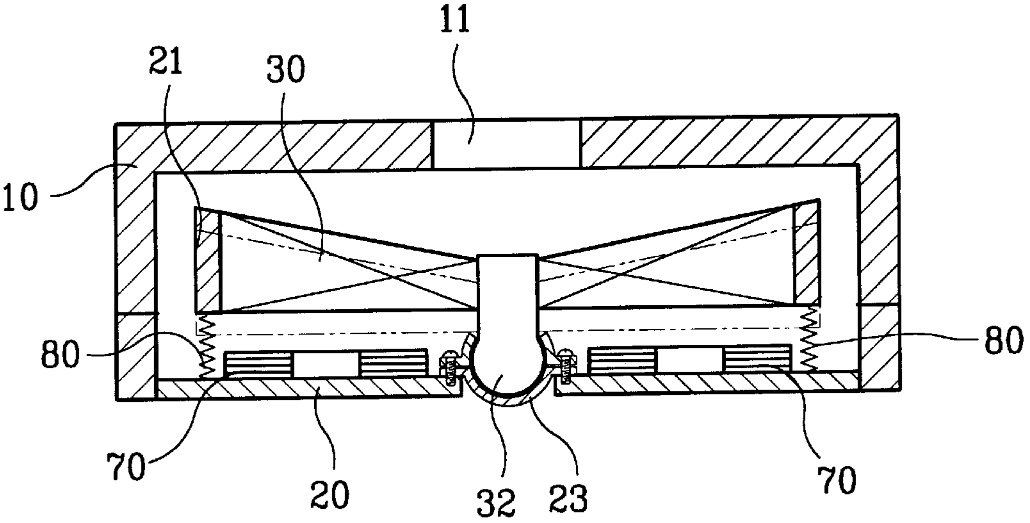
FIG. 17 is a longitudinal cross-sectional view illustrating operations of the vibration apparatus according to the fourth embodiment of the present invention when a sound wave is generated as the vibrating section moves up and down in the case that a structure for supporting a vertical shaft is modified.

In the present embodiment, a shaft seat 23 as shown in FIG. 17 can be used in place of the damping member 22 to support the lower end of the vertical shaft 32. In this case, the lower end of the vertical shaft 32 has a spherical cross-section to be inserted into and rotatably supported by the shaft seat 23.

Figure 18:
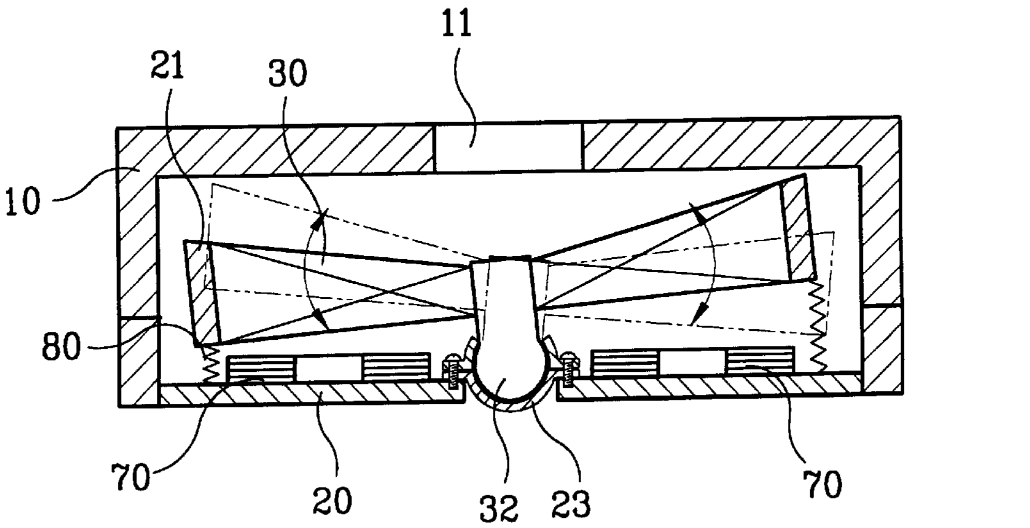
FIG. 18 is a longitudinal cross-sectional view illustrating operations of the vibration apparatus according to the fourth embodiment of the present invention when a vibration is generated as the vibrating section seesaws sideways in the case of the structure of FIG. 17.

In the construction of the vibration apparatus according to the present embodiment, if a high frequency current is inputted into the pair of vibrating coils 70, the magnet 30 of the vibrating section moves up and down along the vertical shaft 32 to perform a sounding function, and if a low frequency current is inputted into the pair of vibrating coils 70, the upper end of the vertical shaft 32 seesaws sideways about the shaft seat 23 as shown in FIG. 18 to perform a vibrating function.

As described above, in the present invention, a sounding signal or a vibrating signal is generated by electromagnetic force created by a magnetic field flowing through the voice coil 50 or the pair of vibrating coils 70 and a magnetic field of the magnet 30, depending on a signal inputted into the driving control section.

Especially, in the respective embodiments described above, the signal inputted into the driving control section 90 is a current having a predetermined frequency, and is largely divided into a high frequency current for generating a sound wave and a low frequency current for generating a vibration.

Generally, the high frequency current for generating a sound wave has a frequency signal of about 2 kHz which is within an audible frequency band, and the low frequency current for generating a vibration has a frequency signal of about 500 Hz.

Figure 19:
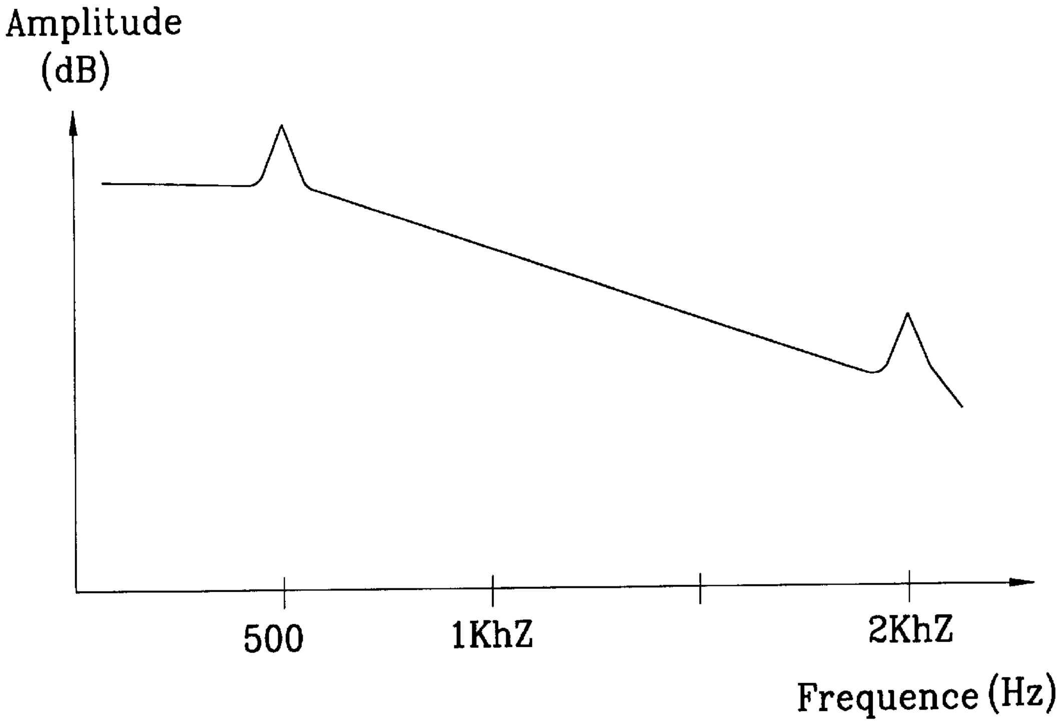
FIG. 19 is a graph showing a relationship between frequency and amplitude of a current.

In other words, when currents having various frequencies from a low frequency to a high frequency are inputted into the voice coil 50 or the pair of vibrating coils 70, when assuming that K is constant and m is mass, because an amplitude is represented as given in an equation described below:

$$\text{Amplitude} = \frac{1}{\sqrt{1 - \frac{f}{\left(\frac{1}{2\Pi} \cdot \frac{K}{m}\right)}}}$$

where $$f(\text{natural frequency}) = \left(\frac{1}{2\Pi}\right)\left(\frac{K}{m}\right)^{\frac{1}{2}}$$

it is to be readily understood from FIG. 19 that a severe variation in amplitude is generated at 500 Hz in low frequency and a severe variation in amplitude is generated at 2kHz in high frequency.

However, since an audible frequency which can be heard by the human ear as a sound is generally no less than 2 kHz, at a frequency range where amplitude is increased in low frequency, it is impossible to hear a sound and it is only possible to feel a vibration.

Also, due to the fact that amplitude is gradually decreased while passing through 500 Hz and is increased again at 2 kHz which is a high frequency, because frequency in this situation is included in an audible frequency band as a sound wave which can be heard by the human ear is generated, a person can hear the sound wave as a sound.

On the other hand, natural frequencies of vibrating bodies which are vibrated in the respective embodiments of the present invention correspond to vibrating frequencies included in a frequency band where they vibrate.

As described above, by moving up and down or seesawing sideways a vibrating body with a simple structure depending on a frequency of an inputted current, the vibration apparatus of the present invention can perform a sounding function to play a preset melody or ring a bell and a vibrating function to vibrate a case of a communication device, as occasion arises.

Consequently, even without the provision of a separate vibrating motor in a communication device such as a portable phone, a beeper or the like, since a sounding function and a vibrating function can be performed by the vibration apparatus of the present invention, the number of components can be reduced and the communication device can be miniaturized.

Due to the fact that a component mounting space is decreased, miniaturization of the communication device can be promoted and marketability can be improved. Moreover, due to the fact that the number of components is reduced and manufacturing and assembling processes are simplified, manufacturing cost can be remarkably reduced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A vibration apparatus capable of generating and externally transmitting a sound wave of audible frequency and transmitting a vibration for notification, the apparatus comprising:

a first vibrating section having an upper cover formed with a sound discharging hole, a lower cover coupled to a lower end of the upper cover, and a magnet and a yoke sequentially secured on the lower cover;

a second vibrating section having a vibrating plate coupled to an inner surface of the upper cover of the first vibrating section and a voice coil attached to the vibrating plate;

a fixed section having a fixed cover positioned below the first vibrating section and connected to the first vibrating section by an elastic member, and a pair of vibrating coils attached onto the fixed cover such that they are opposite to the magnet of the first vibrating section; and a driving control section connected to both ends of the voice coil and both ends of each of the pair of vibrating coils, the driving control section allowing a high frequency current for generating a sound wave to flow to both ends of the voice coil of the second vibrating section when the high frequency current is inputted therein and causing the second vibrating section to move up and down by electromagnetic force created between the voice coil and the magnet thereby to enable a generated sound wave to be discharged through the sound discharging hole formed in the upper cover of the first vibrating section, the driving control section allowing a low frequency current for generating a vibration to flow to both ends of each of the pair of vibrating coils attached onto the fixed cover when the low frequency current is inputted therein such that currents having different polarities flow through the pair of vibrating coils and causing the first vibrating section to seesaw by electromagnetic force created between the pair of vibrating coils and the magnet thereby to generate a vibration.

2. The vibration apparatus as claimed in claim 1, wherein the driving control section comprises:

a current supplying part for supplying a high frequency current and a low frequency current which are predetermined frequencies, to the voice coil of the second vibrating section and to the pair of the vibrating coils of the fixed section, respectively; and a switching part for selectively switching connecting positions of the pair of vibrating coils such that currents having different polarities flow through the pair of vibrating coils.

3. The vibration apparatus as claimed in claim 1, wherein the magnet of the first vibrating section defines two magnetic circuits between the upper cover and the lower cover and between the lower cover and the fixed cover, respectively, each magnetic circuit having a magnetic gap, and the voice coil of the second vibrating section and the pair of vibrating coils of the fixed section are positioned such that they are orthogonal to a magnetic field of the magnet in their respective magnetic gaps.

4. The vibration apparatus as claimed in claim 1, wherein the fixed section has at least one pair of vibrating coils to enable the first vibrating section to seesaw in a rotational direction.

5. A vibration apparatus capable of generating and externally transmitting a sound wave of audible frequency and transmitting a vibration for notification, the apparatus comprising:

a first vibrating section having an upper cover and a magnet secured to an inner surface of the upper cover;

a fixed section having a fixed cover positioned below the upper cover and connected to the upper cover by a first elastic member, the fixed cover being formed at a center portion thereof with a sound discharging hole;

a second vibrating section having a vibrating plate positioned above the fixed cover and connected to the fixed cover by a second elastic member and a pair of vibrating coils attached onto the vibrating plate; and a driving control section connected to both ends of each of the pair of vibrating coils of the second vibrating section, the driving control section allowing currents having the same polarity to flow to both ends of each of the pair of vibrating coils when a high frequency current for generating a sound wave is inputted therein and causing the second vibrating section to move up and down by electromagnetic force created between the pair of vibrating coils and the magnet of the first vibrating section thereby to enable a generated sound wave to be discharged through the sound discharging hole formed in the fixed cover of the fixed section, the driving control section allowing currents having different polarities to flow to both ends of each of the pair of vibrating coils when a low frequency current for generating a vibration is inputted therein and causing the first vibrating section to seesaw by electromagnetic force created between the pair of vibrating coils and the magnet of the first vibrating section thereby to generate a vibration.

6. The vibration apparatus as claimed in claim 5, wherein the driving control section comprises:

a current supplying part for supplying a high frequency current and a low frequency current which are predetermined frequencies, to the pair of the vibrating coils; and a switching part for selectively switching connecting positions of the pair of vibrating coils such that currents having different polarities or currents having the same polarity selectively flow through the pair of vibrating coils.

7. The vibration apparatus as claimed in claim 5, wherein the magnet of the first vibrating section defines a magnetic circuit having a magnetic gap between the upper cover and the fixed cover, and the pair of vibrating coils of the second vibrating section are positioned such that they are orthogonal to a magnetic field of the magnet in the magnetic gap.

8. The vibration apparatus as claimed in claim 5, wherein the second vibrating section has at least one pair of vibrating coils to enable the first vibrating section to seesaw in a rotational direction.

9. A vibration apparatus capable of generating and externally transmitting a sound wave of audible frequency and transmitting a vibration for notification, the apparatus comprising:

an outer case having an upper cover formed with a sound discharging hole, and a lower cover coupled to a lower end of the upper cover;

a first vibrating section having a magnet positioned above the lower cover and connected to the lower cover by an elastic member, and a vertical shaft possessing a lower end connected to the lower cover and an upper end movably guiding the magnet;

a second vibrating section having a vibrating plate possessing an edge portion secured to an inner surface of the upper cover at a place where the vibrating plate is opposite to an upper surface of the magnet, and a pair of vibrating coils attached onto a surface of the vibrating plate which faces the upper surface of the magnet; and a driving control section connected to both ends of each of the pair of vibrating coils of the second vibrating section, the driving control section allowing currents having the same polarity to flow to both ends of each of the pair of vibrating coils when a high frequency current for generating a sound wave is inputted therein and causing the second vibrating section to move up and down by electromagnetic force created between the pair of vibrating coils and the magnet thereby to enable a generated sound wave to be discharged through the sound discharging hole formed in the upper cover, the driving control section allowing currents having different polarities to flow to both ends of each of the pair of vibrating coils when a low frequency current for generating a vibration is inputted therein and causing the magnet of the first vibrating section to seesaw by electromagnetic force created between the pair of vibrating coils and the magnet thereby to generate a vibration as a seesaw motion of the magnet is transferred to the outer case through the elastic member and the vertical shaft.

10. The vibration apparatus as claimed in claim 9, wherein the driving control section comprises:

a current supplying part for supplying a high frequency current and a low frequency current which are predetermined frequencies, to the pair of the vibrating coils; and a switching part for selectively switching connecting positions of the pair of vibrating coils such that currents having different polarities or currents having the same polarity selectively flow through the pair of vibrating coils.

11. The vibration apparatus as claimed in claim 9, wherein the magnet of the first vibrating section defines a magnetic circuit having a magnetic gap between the upper cover and the lower cover, and the pair of vibrating coils of the second vibrating section are positioned such that they are orthogonal to a magnetic field of the magnet in the magnetic gap.

12. The vibration apparatus as claimed in claim 9, wherein the second vibrating section has at least one pair of vibrating coils to enable the first vibrating section to seesaw in a rotational direction.

13. The vibration apparatus as claimed in claim 9, wherein the vertical shaft is connected to the lower cover via a damping member to allow the upper end thereof to be moved sideways.

14. The vibration apparatus as claimed in claim 9, wherein a weight is attached to a lower surface of the magnet to amplify the seesaw motion of the magnet.

15. A vibration apparatus capable of generating and externally transmitting a sound wave of audible frequency and transmitting a vibration for notification, the apparatus comprising:

an outer case having an upper cover formed with a sound discharging hole, and a lower cover coupled to a lower end of the upper cover;

a vibrating section having a magnet positioned above the lower cover, connected to the lower cover by an elastic member and possessing an upper surface which is tapered upward from a center portion thereof toward an edge portion thereof, a vertical shaft possessing a lower end connected to a center portion of the lower cover and an upper end movably guiding the magnet, and a pair of vibrating coils attached onto an upper surface of the lower cover which is opposite to the magnet; and a driving control section connected to both ends of each of the pair of vibrating coils of the vibrating section, the driving control section allowing currents having the same polarity to flow to both ends of each of the pair of vibrating coils when a high frequency current for generating a sound wave is inputted therein and causing the magnet of the vibrating section to move up and down by electromagnetic force created between the pair of vibrating coils and the magnet thereby to enable a generated sound wave to be discharged through the sound discharging hole formed in the upper cover, the driving control section allowing currents having different polarities to flow to both ends of each of the pair of vibrating coils when a low frequency current for generating a vibration is inputted therein and causing the magnet of the vibrating section to seesaw by electromagnetic force created between the pair of vibrating coils and the magnet thereby to generate a vibration as a seesaw motion of the magnet is transferred to the upper cover and the lower cover through the elastic member and the vertical shaft.

16. The vibration apparatus as claimed in claim 15, wherein the driving control section comprises:

a current supplying part for supplying a high frequency current and a low frequency current which are predetermined frequencies, to the pair of the vibrating coils; and a switching part for selectively switching connecting conditions at both ends of the pair of vibrating coils such that currents having different polarities or currents having the same polarity selectively flow through the pair of vibrating coils.

17. The vibration apparatus as claimed in claim 15, wherein the magnet of the vibrating section defines a magnetic circuit having a magnetic gap between the upper cover and the lower cover, and the pair of vibrating coils of the vibrating section are positioned such that they are orthogonal to a magnetic field of the magnet in the magnetic gap.

18. The vibration apparatus as claimed in claim 15, wherein the vibrating section has at least one pair of vibrating coils to enable the magnet of the vibrating section to seesaw in a rotational direction.

19. The vibration apparatus as claimed in claim 15, wherein the vertical shaft is connected to the lower cover via a damping member to allow the upper end thereof to be moved sideways.

20. The vibration apparatus as claimed in claim 15, wherein a weight is attached to a lower surface of the magnet to amplify the seesaw motion of the magnet.

21. The vibration apparatus as claimed in claim 15, wherein a weight is attached to both side surfaces of the magnet to amplify the seesaw motion of the magnet.

* * * * *